United States Patent [19]
McGoldrick et al.

[11] Patent Number: 5,324,181
[45] Date of Patent: Jun. 28, 1994

[54] PRECISELY ADJUSTABLE PNEUMATIC CALIBRATION PUMP

[75] Inventors: Christopher R. McGoldrick, West Henrietta; Donald F. Cimino, Rochester, both of N.Y.

[73] Assignee: Transmation, Inc., Rochester, N.Y.

[21] Appl. No.: 99,438

[22] Filed: Jul. 30, 1993

[51] Int. Cl.$^5$ .............................................. G01L 27/00
[52] U.S. Cl. ..................... 417/541; 73/4 R; 137/860; 251/121; 251/205; 251/225
[58] Field of Search ............... 251/121, 205, 208, 221, 251/225; 137/860; 73/4 R; 417/541, 543, 544

[56] References Cited

U.S. PATENT DOCUMENTS

| | | | |
|---|---|---|---|
| 821,988 | 5/1906 | Craig | 73/4 D |
| 2,980,392 | 4/1961 | Greenwood | 251/205 X |
| 3,154,486 | 10/1964 | Weaver | 137/860 X |
| 3,384,338 | 5/1968 | Dermody | 251/216 X |
| 3,436,955 | 4/1969 | Wilcher | 73/4 R |
| 4,766,765 | 8/1988 | Ezekoya | 73/4 R |

*Primary Examiner*—Richard E. Gluck
*Attorney, Agent, or Firm*—Jay M. Cantor

[57] ABSTRACT

A pneumatic calibration system and the pump therefore, the system comprising a first fluid containing chamber for attachment to a device to be tested, a valve coupled to the first chamber to remove the fluid from the first chamber and a pump structure for providing a predetermined pressure to the fluid in the first chamber. The pump comprises a first piston disposed and moveable within first chamber to vary the volume of first chamber, a second piston, a second fluid containing chamber communicating between the first piston and the second piston, the second piston providing a predetermined pressure to the fluid in the second chamber and an expanding sleeve valve communicating between the first chamber and the second chamber to minimize the pressure differential across the first piston. The position of the first piston is adjustable in the first chamber. The second chamber includes a first portion and a second portion with a sleeve valve disposed therebetween. The valve coupled to the first chamber comprises a shaft positionable external of the first chamber and having a slit disposed in the distal end thereof, the slit extending parallel to the axis of the shaft, an "O"-ring disposed around the shaft and providing a seal around the shaft and positioning structure to selectively position the slit relative to the "O"-ring so that at least a portion of the slit extends external of the first chamber to permit fluid to escape from the first chamber at a predetermined rate.

16 Claims, 3 Drawing Sheets

PRECISELY ADJUSTABLE PNEUMATIC CALIBRATION PUMP

BACKGROUND OF THE INVENTION

1. Field of the Invention

This invention relates to a hand operated pump for use in calibration of pneumatic instruments.

2. Brief Description of the Prior Art

The usefulness of pressure calibration pumps is generally defined in terms of (1) the maximum pressure which may be established within the trapped volume of the calibration interconnection system, (2) the precision of pressure adjustment which may be set, particularly at high pressures, and (3) the fineness of bleed adjustment which can be made over a large number of use cycles.

The maximum pressure which can be achieved by any pump is fixed by its compression ratio, this being the quotient of maximum pump volume to minimum pump volume. Larger numbers are better and are achieved by making the volume represented by the intake and exhaust valves as small as possible.

The typical arrangement for calibrating the pressure applied to a device under test (DUT) includes the pressure sensitive instrument to be calibrated or device under test (DUT), a precision pressure gauge (calibrator or reference standard) and a hand pump with volume adjustment or volume trim and bleed or relief valve with interconnecting tubing and fittings. The prior art pump, as shown in FIG. 2, generally comprises a first cylinder 13 with a first piston 15, a second cylinder 17 with a second piston 19 and a relief valve 9. The volume of the second cylinder 17 may be changed by rotating the volume trim knob 7, causing the second piston 19 to move within the second cylinder, changing the volume of the second cylinder as well as the total trapped fluid volume. By this means, the captured pressure may be adjusted to the precisely required value.

The conventional precision pressure adjustment is made by moving the second piston 19 within the second cylinder 17 by means of screw threads. The force acting on the screw threads is equal to the internal pump pressure multiplied by the projected area of the second piston 19, less the outside or atmospheric pressure acting on the projected area of the backside of the second piston. The net pressure induced force increases with internal pressure. That force multiplied by the coefficient of friction of the screw threads opposes the operator attempted movement of the threads. Eventually a pressure is reached at which the turning of the adjustment knob 7 becomes inordinately difficult and precise volume adjustment is no longer possible.

Bleed or relief valves of prior art design, which are generally used with the second cylinder/piston device 17, 19, employ conically shaped needles within matching conical valve seats. Typically, a screw arrangement moves the needle within its seat. The gap between the needle and its seat fixes the flow rate of the escaping fluid, that is the rate at which the internal compressed air escapes or bleeds to the atmosphere. To provide complete sealing, needle and seat must be perfectly matched and be jammed together to less than gas molecule dimensions. This jamming together of needle and seat, aided by dirt in the air, eventually causes damage to the mating parts and the valve commences leaking. Choice of needle and seat materials and addition of special end of stroke sealing provisions can overcome the eventual leaking problem, but always at the expense of fineness of adjustment. The traditional design is also subject to damage by overtightening.

SUMMARY OF THE INVENTION

With the pump in accordance with the present invention, the above described problems of the prior art are overcome by permitting the pressure at the backside of the second piston to be close in value to the pressure on the front side, thereby greatly reducing the differential pressure across the second piston and the force on the threads. The initial differential pressure following a pump stroke is fixed by a valve and thus makes the force on the threads substantially independent of the operating pressure level of the pump. No secondary action or drive is required to attain this state, it happens automatically. A sleeve type valve is used to connect the back and front side of the second piston and establishes the initial differential pressure which may exist across that piston in the pressure delivered state. For this technique to be practical, a low differential pressure value must be used. A high differential pressure across the valve would limit the sensitivity and directly subtract from the ultimate pressure available in the downstream region. That is the reason for the significance of the combination of these techniques and devices. In fact, the development of the sleeve valve is a necessary precursor to the generation of the volume adjust concept herein. The differential pressure increases as the fluid on the downstream side of the second piston is compressed, i.e., the delivered pressure is made to increase by operating the volume trim piston and the upstream section is expanded.

The traditional needle valve is replaced by a micro-metering bleed valve. An axially movable shaft with an "O"-ring in a static, radial seal configuration is used to prevent air from escaping from a pressurized compartment on one side of the "O"-ring which is high durometer and scratch resistant, preferably polyurethane. A microscopic slit is carved longitudinally on the surface of the shaft. As the shaft moves axially, air is allowed to travel past the radial "O"-ring seal on the shaft when the leading edge of the micro-slit passes the contact area of the "O"-ring with the shaft. Typically, the shaft with the micro-slit is moved within the "O"-ring by means of a screw thread and attached knob. The rate at which air will escape as a function of shaft movement depends upon the shape of the micro-slit and the thread pitch of the shaft. Slit dimensions and thread pitch are determined so that bleeding will commence within one fourth turn of the knob and with full exhaust flow at one turn. The shape is imparted by using a circular slitting saw. The curved shape of the slit is significant in making the cross-sectional area of the groove a variable function of shaft position. This is especially important because it allows extremely small amounts of air to escape when flow is initiated with full flow at one turn. It is the shape of this slit that allows for "tuning" of the exhaust profile.

The depth of the cut and width of the slit determine the maximum bleed rate and are set to suit the needs of the product. Typically, a cutter diameter of 1" with a cutter width of 0.01" and a cut depth of 0.005" are used when the valve shaft diameter is 0.185".

Proper choice of "O"-ring material insures that the wiping of the micro-groove past the "O"-ring, as the shaft turns within the "O"-ring, does not cause the cutting or shaving of "O"-ring material. The polyurethane or similar type "O"-ring is required for long term operation of the device. Softer materials such as standard BUNA "O"-rings are quickly scraped off by the sharp edges of the slit. The debris fills the groove and prevents further operation.

The poppet valve normally used as the exhaust valve for the main or first cylinder of the hand operated piston is replaced by a sleeve valve. The advantage of the arrangement is to provide very small upstream trapped volume, low differential operating pressure and outstanding sealing, particularly at very low pressures. An elastomeric sleeve is stretched over a shaped sealing cylinder which carries a peripheral, specifically shaped, groove. The groove communicates with an axial hole via radial holes through the mounting stem and "O"-ring carrying sealing base. The stretch force, aided by any pressure acting on the outside of the sleeve, closes off the peripheral groove and prevents downstream pressure from escaping or returning to the upstream side of the valve. The higher the pressure, the better the seal (up to material failure). Low pressure sealing is a vital part of the calibration process (differential measurements) and cannot be sacrificed to obtain high pressure seals.

Upstream pressure, applied to the interior of the sleeve at the peripheral groove via the axial and radial holes causes the sleeve to expand and lose its seal to the shaped sealing cylinder. By this route, upstream pressure is readily communicated to the downstream side of the valve.

Depending upon the choice of sleeve material and the shape and size of the sealing cylinder, differential pressures of as little as 1 psi (pound per square inch) are sufficient to crack the valve over a broad range of pressure levels. The sleeve valve is insensitive to the axial position of the sleeve on the shaped sealing cylinder as long as that cylinder is totally overlapped by the sleeve. Sealing is enhanced in a predictable way by insuring that the sealing surfaces of the shaped cylinder are smooth and well polished. The peripheral groove and the radial and axial holes, as applied to hand pumps, may be made quite small, leading to an extremely low trapped volume. The only moving part of the valve is the elastomer sleeve.

The volume adjustment depends upon the sleeve valve to communicate the bulk of the pressure on the back side of the volume adjustment or second piston, coming from the hand operated first piston to the front side of the volume adjustment piston. The front or downstream pressure of the volume adjustment piston is applied to the device under test via a pump output port connection. The downstream pressure is relieved via the bleed valve.

The bleed valve is used to lower the pressure to the device under test (DUT) and the hand operated first piston is used to raise the pressure. Once a near desired DUT pressure has been established by manual pumping, the volume adjustment piston may be turned into its associated cylinder to raise the DUT pressure by any amount up to that dictated by the available volume change or out of its cylinder to lower the delivered pressure by at most the differential cracking pressure of the valve.

As normally used, the pressure is raised by manual pumping to slightly less than the desired value. Then the volume adjustment piston is turned to travel inwardly to raise the pressure to the exact desired value. Pressure changes caused by temperature changes of the trapped gas or creep in the pressure containing interconnecting tubing or leaks may be compensated for by moving the second piston in or out, by operation of the volume adjustment, as appropriate.

The concept of using an expanding sleeve for valving, coupled with the idea of pressurizing the back of an adjustment piston and enhanced by a micro slit based bleed valve, combine to form a very useful and novel product. This objective is achieved by the present invention through the use of a novel sleeve type exhaust valve of extremely small trapped volume. This valve additionally is characterized by a very low pressure drop which becomes important when this valve is used as a component in the volume adjustment.

BRIEF DESCRIPTION OF THE DRAWINGS

FIG. 4c is an enlarged view of the "O"-ring contact region of FIG. 4a;

DESCRIPTION OF THE PREFERRED EMBODIMENT

Figure 1:
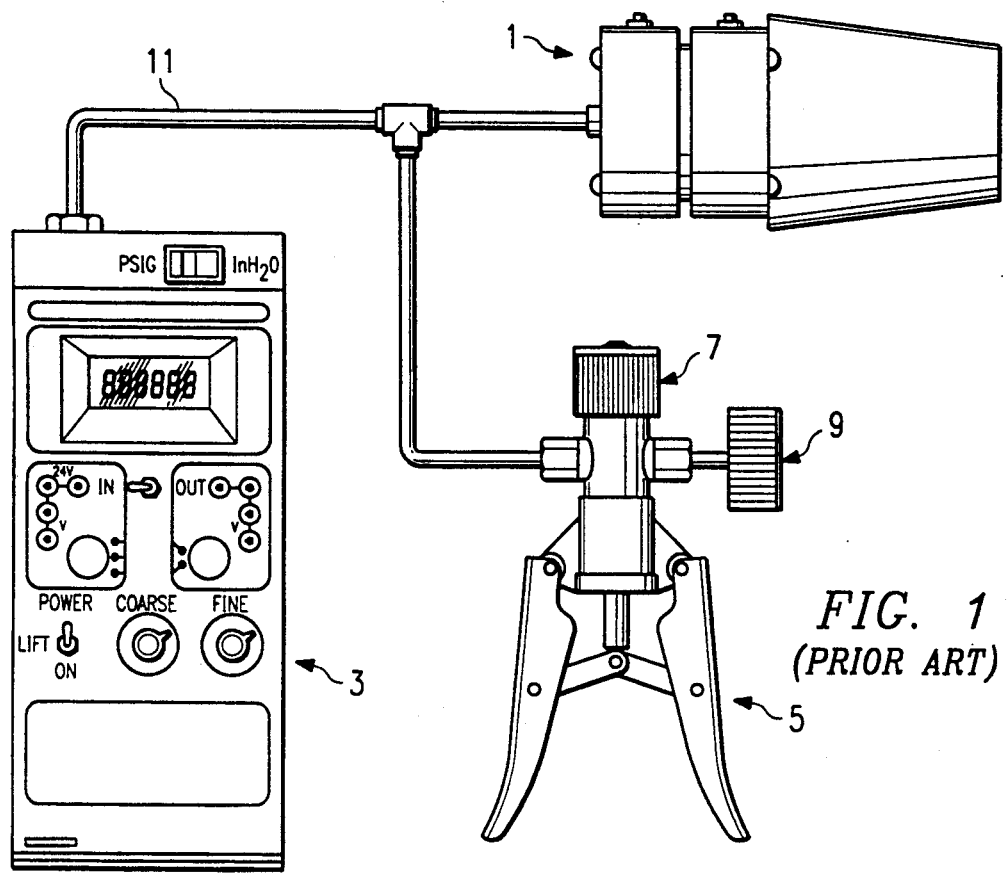
FIG. 1 is a schematic diagram of a typical pressure calibration system for a device under test.
Figure 2:
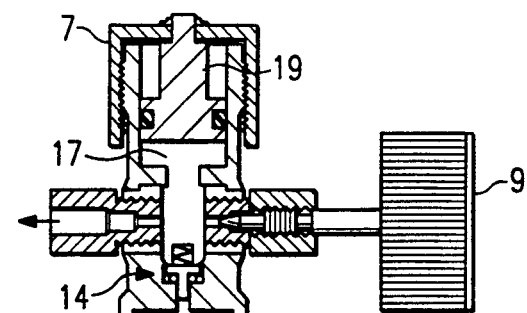
FIG. 2 is a sectional view of a conventional hand pump.
Figure 2:
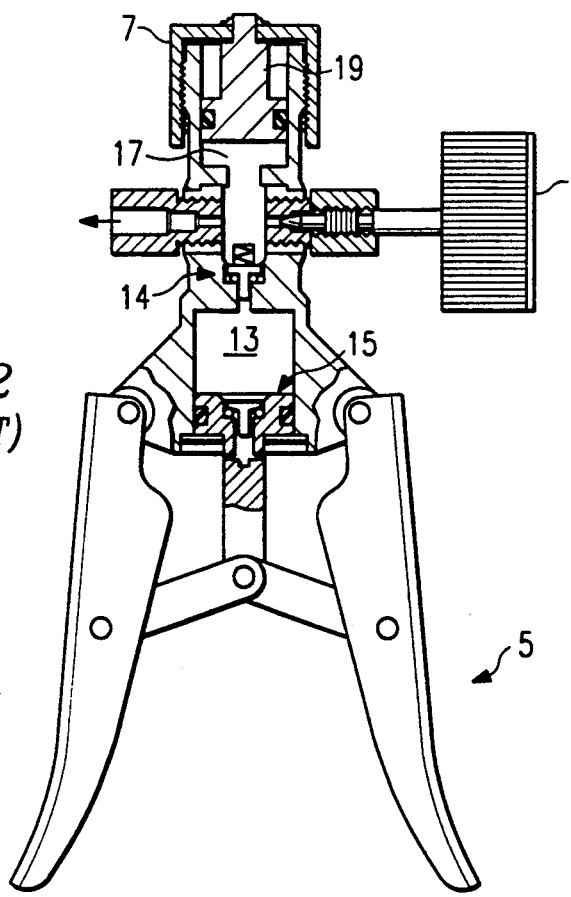

FIG. 1 shows a typical prior art pressure calibration system including a pressure sensitive instrument or device under test (DUT) 1 to be calibrated, a precision pressure gauge (calibrator or reference standard) 3, a hand pump 5 with volume adjustment or trim knob 7 and bleed or relief valve 9 with interconnecting tubing and fittings 11. The hand pump 5, as better shown in FIG. 2, comprises a first cylinder 13 with a first piston 15 which travels therein and, with relief valve 9 closed, is manually operated to establish, approximately, the desired calibration pressure to the calibrator 3 and DUT 1. The pressure calibrator 3 is preferably a precision digital pressure gauge and indicates the pressure applied by the pump 5 to the DUT 1. The system fluid, generally but not limited to air, which provides the system pressure, is trapped by the cavities of the pump 5, DUT 1, the calibrator 3 and the internal volume of the interconnecting tubing and fittings 11. Part of the cavity of the pump 5, as shown in prior art FIG. 2, is a second cylinder/piston arrangement 17/19, the volume of which may be changed by rotating the volume trim knob 7. Rotation of the knob 7, with the aid of screw threads, causes the second piston 19 to move within the second cylinder 17, changing the fluid volume within the second cylinder as well as the total trapped fluid volume. By this means, the captured pressure may be adjusted to the precisely required value.

Figure 3:
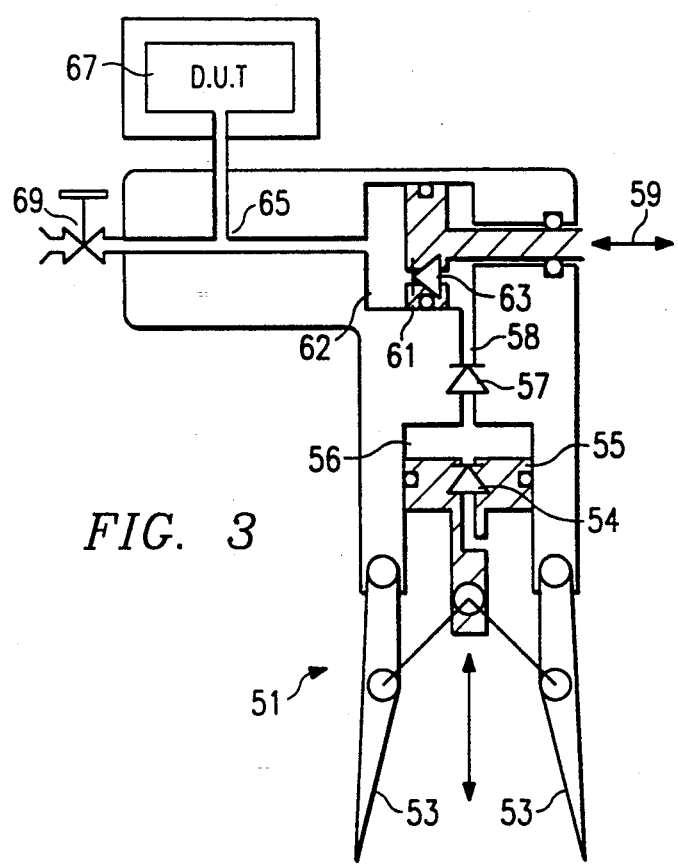
FIG. 3 is a schematic diagram of a pressure calibration system with a precision hand pump in accordance with the present invention.

Referring now to FIG. 3, there is shown a schematic diagram of a pressure calibrating system with a precision hand pump in accordance with the present invention. The system includes a hand pump 51 having handles 53 for moving a first piston 55 in a first cylinder 56 having a first sleeve valve 57 at the outlet of cylinder 56. A volume adjustment 59 operates via a second piston 61 in a second cylinder 62 and a second sleeve valve 63 with fluid travelling through valve 63 from the pump 51 and, via interconnections 65, to a DUT 67 and bleed valve 69 vented to the atmosphere. As normally used, the pressure to the DUT 67 is raised by manually operating pump handles 53 to obtain a pressure near and preferably slightly less than the desired value at the DUT, this being obtained by compression of fluid in the cylinder 56, causing such fluid to travel through first sleeve valve 57 to the chamber 58 at the upstream side of piston 61, then through the second sleeve valve 63 to the DUT via interconnecting passage 65. Then the volume adjustment 59 is turned to change the pressure, such turning preferably moving piston 61 inwardly to raise the pressure to the exact desired value at the DUT 67. Pressure changes caused by temperature changes of the trapped gas or creep in the pressure containing interconnecting tubing 65 may be compensated for by moving the second piston 61 in or out, as appropriate.

The volume adjustment 59 depends upon the second sleeve valve 63 to communicate the bulk of the pressure on the back side of the volume adjustment piston 61 and in passage 58, coming from the hand operated first piston 55, to the front side of the volume adjustment piston 61. The front or downstream pressure of the volume adjustment piston 61 is applied to the device under test 67 via connection 65 to the pump output port connection and internally to the built-in bleed valve 69.

The bleed valve 69 is used to lower the pressure at the device under test (DUT) 67 and the hand operated first piston 55 is used to raise the pressure. Once a near desired pressure at DUT 67 has been established by manual pumping, the volume adjustment piston 61 may be moved into its associated cylinder 62 to raise the pressure at the DUT by any amount, or out of its cylinder 62 to lower the delivered pressure by up to the differential cracking pressure of the valve 63.

Figure 4C:
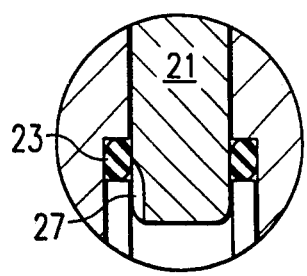
Figure 4D:
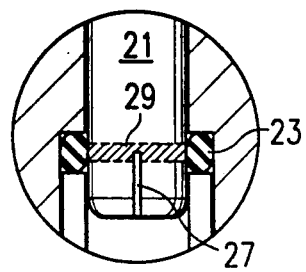
Figure 4A:
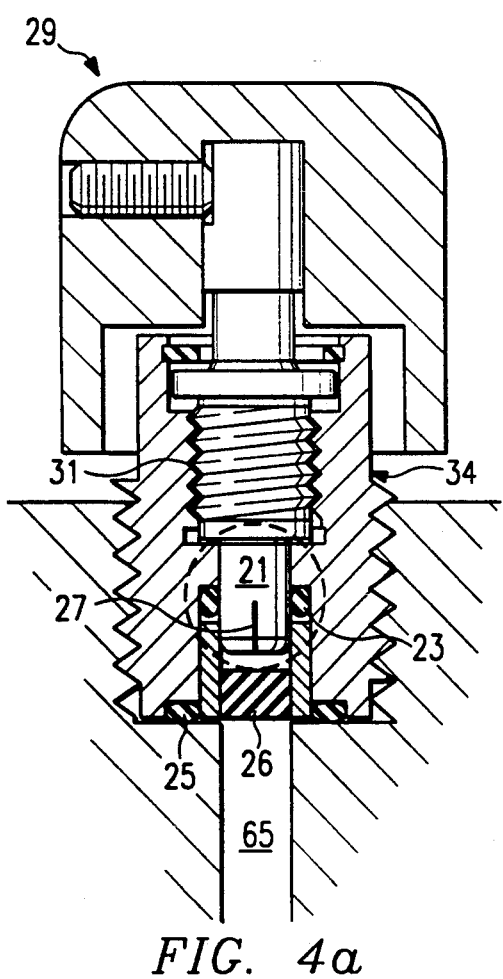
FIG. 4a is a sectional view of the relief/bleed valve assembly 69 in accordance with the present invention.
Figure 4B:
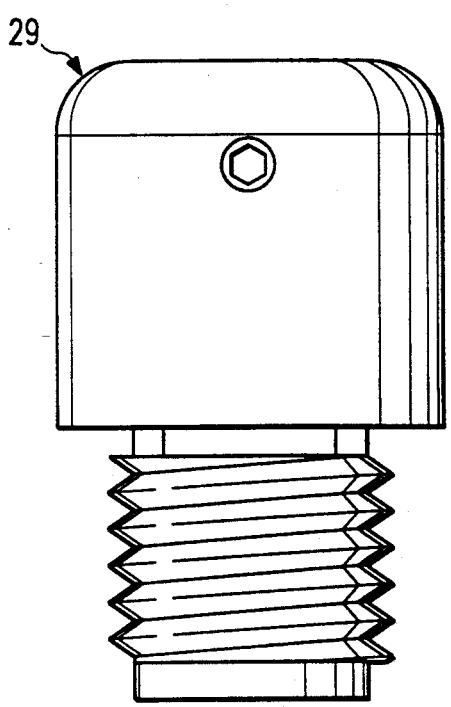
FIG. 4b is an external view of relief/bleed valve 69 of FIG. 3.

Referring now to FIGS. 4a to 4c, there is shown the relief or bleed valve 69 in accordance with the present invention. An axially moveable shaft 21 with a polyurethane "O"-ring 23 in a static, radial seal configuration is used to prevent air from escaping from a pressurized compartment on one side of the "O"-ring to the outside world or atmosphere on the other side of the "O"-ring. A microscopic slit 27 is carved longitudinally on the surface of the shaft 21. As the shaft 21 moves axially, air confined by the sealing "O"-ring 23 to the interior and tip end of shaft 21 is allowed to travel past radial "O"-ring 23 on the shaft 21 when the leading edge of the microscopic slit 27 passes the contact area 29 of "O"-ring 23 with the shaft. Air enters the valve at the tip of the shaft 21 and leaves at thread end of shaft 21. As shown in FIG. 4a, air enters the valve at the filter end 26 and moves upward through the slit 27, past the "O"-ring 23, through clearance space of the shaft with body 34 to the atmosphere. The so released air mingles with atmospheric pressure air which exists within the adjustment knob 29 and around attached adjustment threads 31.

Typically, the shaft 21 with the micro-slit 27 is moved within the "O"-ring 23 by means of a screw thread 31 and attached knob 29. The rate at which air will escape as a function of shaft movement depends upon the shape of the leading portion of the micro-slit 27. That shape is imparted by using a circular slitting saw. The depth and width of the cut determine the maximum bleed rate and are set to suit the needs of the product. Typically, a cutter diameter of 1" with a cutter width of 0.01" and a cut depth of 0.005" are used when the shaft diameter is 0.185". For this arrangement, a shaft movement of 0.063" is required to smoothly change from zero to full bleed flow. When 16 threads per inch are used to move the shaft 21, this motion is accomplished in about one turn of the shaft. Proper choice of "O"-ring material insures that the wiping of the micro-groove 27 past the "O"-ring 23, as the shaft turns within the "O"-ring, does not cause the cutting or shaving of "O"-ring material. Once the micro-slit 27 is fully away from contact region 29 of "O"-ring 23, that "O"-ring seals the shaft to the body 34, irrespective of the exact longitudinal position of the shaft 21. Excessive longitudinal shaft motion is prevented by ordinary mechanical means and places no added stress or wear on "O"-ring 23.

Figure 7A:
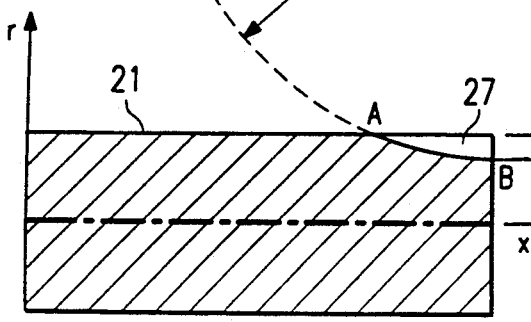
FIGS. 7a and 7b are diagrams depicting the shape of the slit 27.
Figure 7B:
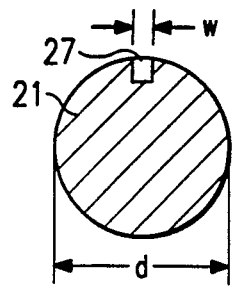

The preferable shape of the slit 27 is determined with reference to FIGS. 7a and 7b where there is shown the shaft 21 with the slit. The slit geometry is determined wherein R is the radius of a circular slitting saw, W is the width of the groove, h is the maximum depth of the groove and d is the diameter of the shaft. Using a cylindrical coordinate system r-x on the shaft 21, rotation of the shaft causes axial movement (x displacement). The slit 27 only partly penetrates the surface of the shaft 21. Due to the particular manufacturing technique used, the depth of the slit varies along the length of the shaft in a continuous manner from zero, where the slit breaks through he surface (point A), to the maximum depth, tangential to the cutting tool (point B). The result is that the area of the slit is a variable function of shaft displacement ($A = f(x)$). The four design variables have been selected, based upon performance considerations such that very low flow rates exist as the valve is first opened and full flow with relatively little additional shaft translation. A key point is that variable area is necessary for performance. Other slit geometries are possible in addition to the preferred geometry described herein. The edges of the slit should be deburred so that the "O"-ring 23 will not be cut or scratched. The remaining surface of the shaft should have a smooth surface finish.

Figure 5A:
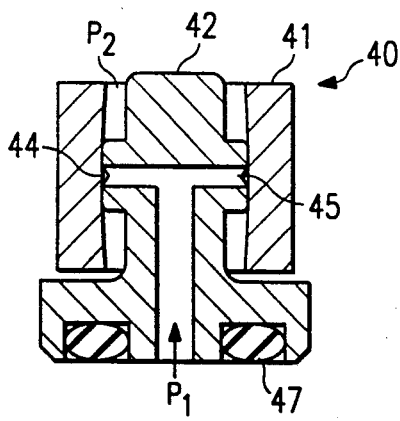
FIG. 5a is a sectional view of the sleeve valve in its normal state.
Figure 5B:
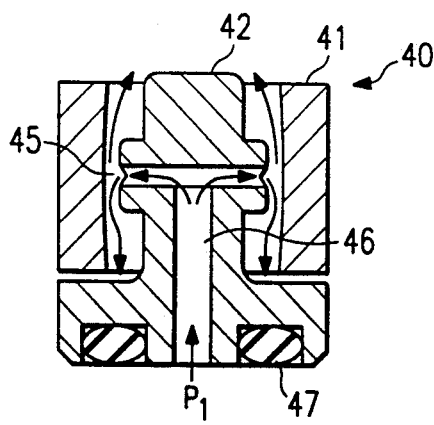
FIG. 5b is a view as in FIG. 5a with the valve in it expanded state.

The poppet valve normally used as the exhaust valve 14 for the main or first cylinder 13 of the hand operated piston 15 of FIG. 2 has been replaced by a sleeve valve 40 as shown in FIGS. 5a and 5b. This valve 40 is shown in FIG. 3 as sleeve valve 57 and separately as part 63 of the volume adjustment 59. The advantage of this arrangement is to provide very small upstream trapped volume, low differential operating pressure and outstanding sealing, particularly at very low pressures.

As shown in FIG. 5a, a prestretched elastomeric sleeve 41 which is smooth and chemically resistant to materials which may be encountered, preferably Tygon tubing, is stretched over a shaped sealing cylinder 42, preferably of brass, having a groove 44 therein which normally contains an annular volume of trapped air therein. The groove 44 must have continuous curvature in the region where the elastomeric sleeve 41 contacts the stem 42. This is to prevent damage (cuts or scratches) to the soft elastomer. Via radial holes 45, the groove 44 communicates with an axial hole 46 through the mounting stem 42 and "O"-ring 47 carrying sealing base. The stretch force of the elastomeric sleeve 41, aided by any pressure acting on the exterior of the sleeve, closes off the peripheral groove 44 and prevents downstream pressure from escaping or returning to the upstream side of the valve 40.

Upstream pressure, applied to the interior of the sleeve valve 40 at the peripheral groove 44, via the axial and radial holes 45 and 46, causes the sleeve 41 to expand, as shown in FIG. 5b and lose its seal to the shaped sealing cylinder 42. By this route, upstream pressure is readily communicated to the downstream side of the valve 40.

Depending upon choice of sleeve material, shape and size of the sealing cylinder, differential pressures of as little as 1 psi (pound per square inch) are sufficient to crack the valve 40 over a broad range of pressure levels. Since the valve requires only 1 to 2 psi to open and two valves are required for the system as a whole to function, only a 2 to 4 psi penalty or loss from the highest acceptable system pressure is incurred. The system as a whole is not practical without the low cracking pressure. The sleeve valve 40 is insensitive to the axial position of the sleeve 41 on the shaped sealing cylinder 42 as long as that cylinder is totally overlapped by the sleeve. Sealing is enhanced in a predictable way by insuring that the sealing surfaces of the shaped cylinder 42 are smooth, continuous and well polished. This also prevents damage to the soft elastomer sleeve material. The peripheral groove 44 and the radial and axial holes 45 and 46, as applied to hand pumps, may be made quite small, leading to an extremely low trapped volume. The only moving part of the valve is the elastomer sleeve 41. The continuous and smooth peripheral groove 44 is essential to the low differential pressure operation of the sleeve valve. By having the peripheral groove around the entire circumference, the pressure to lift the elastomer away from the sealing surfaces is distributed and not localized around the cross hole.

Figure 6:
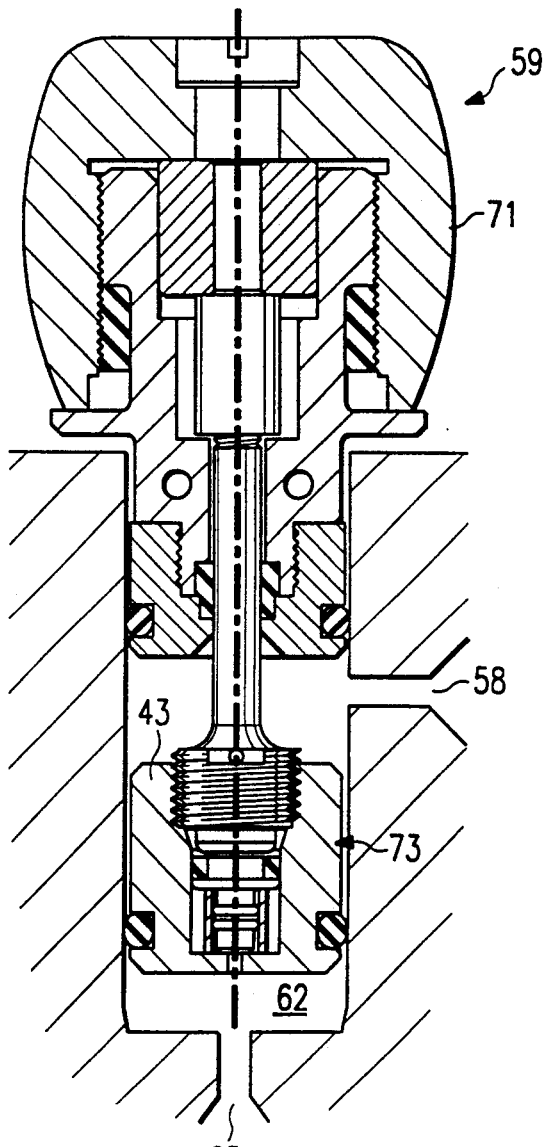
FIG. 6 is a sectional view of a volume adjustment in accordance with the present invention.

As normally used, the pressure at the DUT 67 is initially raised by manual pumping of pump 51 to slightly less than the desired value. Then the volume adjustment 59 as shown in detail in FIG. 6 is moved inwardly by appropriate rotation of the knob 71 to move second piston 73 (61) downwardly. This causes sleeve valve 40 (63), which is shown but need not be integral with piston 73 (61), to move downwardly in cylinder 62 toward exit passage 65 to raise the pressure to the exact desired value. Sleeve valves 57 and 63 permit pump 51 cylinder 56 pressure to be communicated to DUT 67. Sleeve valve 63 prevents any volume adjustment 59 raised DUT 67 pressure from escaping to the cylinder 56 side of volume adjustment piston 73 (61). Pressure changes caused by temperature changes of the trapped gas or creep in the pressure containing interconnecting tubing may be compensated for by moving the piston 73 in and out, as appropriate. It should be understood that the valve 40 (63) need not be within the second piston 73 (61) and was so described for convenience only. It is merely necessary that the two sides of the piston be connected via the valve.

The ideas of using an expanding sleeve over a shaped peripheral groove for valving, coupled with the idea of delivering pressure via the pressurizing of the back of an adjustment piston and enhanced by a micro slit based bleed valve combine to form a very useful and novel product. This objective is achieved in the case of the new pump through the use of a novel sleeve type exhaust valve of extremely small trapped volume. This valve additionally is characterized by a very low pressure drop which becomes important when this valve is used as a component in the volume adjustment.

Though the invention has been described with respect to a specific preferred embodiment thereof, many variations and modifications will immediately become apparent to those skilled in the art. It is therefore the intention that the appended claims be interpreted as broadly as possible in view of the prior art to include all such variations and modifications.

We claim:

1. A pneumatic calibration system which comprises:
   (a) a second fluid containing chamber for attachment to a device to be tested;
   (b) a valve coupled to said second chamber to remove said fluid from said second chamber; and
   (c) a pump structure for providing a predetermined pressure to said fluid in said second chamber comprising:
      (i) a second piston, said second piston being disposed and moveable within said second chamber to vary the volume of said second chamber;
      (ii) a first piston;
      (iii) a first fluid containing chamber communicating between said first piston and said second piston, said first piston providing a predetermined pressure to said fluid in said first chamber; and
      (iv) an expanding sleeve valve communicating between said first chamber and said second chamber to minimize the pressure differential across said second piston.

2. The system of claim 1 further including adjusting structure to adjust the position of said second piston in said second chamber.

3. The system of claim 1 wherein said first chamber includes a first portion and a second portion with a sleeve valve disposed between said first portion and said second portion.

4. The system of claim 2 wherein said first chamber includes a first portion and a second portion with a sleeve valve disposed between said first portion and said second portion.

5. The system of claim 1 wherein said valve coupled to said second chamber comprises a shaft positionable external of said second chamber and having a slit disposed in the distal end thereof, said slit extending parallel to the axis of said shaft; an "O"-ring disposed around said shaft and providing a seal around said shaft and positioning structure to selectively position said slit relative to said "O"-ring so that at least a portion of said slit extends external of said second chamber to permit fluid to escape from said second chamber at a predetermined rate.

6. The system of claim 2 wherein said valve coupled to said second chamber comprises a shaft positionable external of said second chamber and having a slit disposed in the distal end thereof, said slit extending parallel to the axis of said shaft; an "O"-ring disposed around said shaft and providing a seal around said shaft and positioning structure to selectively position said slit relative to said "O"-ring so that at least a portion of said slit extends external of said second chamber to permit fluid to escape from said second chamber at a predetermined rate.

7. The system of claim 3 wherein said valve coupled to said second chamber comprises a shaft positionable external of said second chamber and having a slit disposed in the distal end thereof, said slit extending parallel to the axis of said shaft; an "O"-ring disposed around said shaft and providing a seal around said shaft and positioning structure to selectively position said slit relative to said "O"-ring so that at least a portion of said slit extends eternal of said second chamber to permit fluid to escape from said second chamber at a predetermined rate.

8. The system of claim 4 wherein said valve coupled to said second chamber comprises a shaft positionable external of said second chamber and having a slit disposed in the distal end thereof, said slit extending parallel to the axis of said shaft; an "O"-ring disposed around said shaft and providing a seal around said shaft and positioning structure to selectively position said slit relative to said "O"-ring so that at least a portion of said slit extends external of said second chamber to permit fluid to escape from said second chamber at a predetermined rate.

9. A pump structure for providing a predetermined pressure to a fluid comprising:
  (a) a second fluid containing chamber for attachment to a device to be tested;
  (b) a second piston, said second piston being disposed and moveable within said second chamber to vary the volume of said second chamber;
  (c) a first piston;
  (d) a first fluid containing chamber communicating between said first piston and said second piston, said first piston providing a predetermined pressure to said fluid in said first chamber; and
  (e) an expanding sleeve valve communicating between said first chamber and said second chamber to minimize the pressure differential across said second piston.

10. The pump of claim 9 further including adjusting structure to adjust the position of said second piston in said second chamber.

11. The pump of claim 9 wherein said first chamber includes a first portion and a second portion and a sleeve valve disposed between said first portion and said second portion.

12. The pump of claim 10 wherein said first chamber includes a first portion and a second portion and a sleeve valve disposed between said first portion and said second portion.

13. The pump of claim 9 further including a valve coupled to said second chamber comprising a shaft and having a slit disposed in the distal end of said shaft, said slit extending parallel to the axis of said shaft; an "O"-ring disposed around said shaft and providing a seal around said shaft and positioning structure to selectively position said slit relative to said "O"-ring so that at least a portion of said slit extends external of said second chamber to permit fluid to escape from said second chamber at a predetermined rate.

14. The pump of claim 10 further including a valve coupled to said second chamber comprising a shaft and having a slit disposed in the distal end of said shaft, said slit extending parallel to the axis of said shaft; an "O"-ring disposed around said shaft and providing a seal around said shaft and positioning structure to selectively position said slit relative to said "O"-ring so that at least a portion of said slit extends external of said second chamber to permit fluid to escape from said second chamber at a predetermined rate.

15. The pump of claim 11 further including a valve coupled to said second chamber comprising a shaft and having a slit disposed in the distal end of said shaft, said slit extending parallel to the axis of said shaft; an "O"-ring disposed around said shaft and providing a seal around said shaft and positioning structure to selectively position said slit relative to said "O"-ring so that at least a portion of said slit extends external of said second chamber to permit fluid to escape from said second chamber at a predetermined rate.

16. The pump of claim 12 further including a valve coupled to said second chamber comprising a shaft and having a slit disposed in the distal end of said shaft, said slit extending parallel to the axis of said shaft; an "O"-ring disposed around said shaft and providing a seal around said shaft and positioning structure to selectively position said slit relative to said "O"-ring so that at least a portion of said slit extends external of said second chamber to permit fluid to escape from said second chamber at a predetermined rate.

* * * * *